US012594923B2

(12) United States Patent
Leitel

(10) Patent No.: US 12,594,923 B2
(45) Date of Patent: Apr. 7, 2026

(54) VEHICLE HAVING A SENSOR ARRANGEMENT FOR MEASURING AN ACTUATING ANGLE OF THE ACTUATING ELEMENT, MEASURING ARRANGEMENT AND MEASUREMENT METHOD

(71) Applicant: Siemens Mobility GmbH, Munich (DE)

(72) Inventor: Holger Leitel, Pullach (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 18/553,284

(22) PCT Filed: Mar. 23, 2022

(86) PCT No.: PCT/EP2022/057662
§ 371 (c)(1),
(2) Date: Sep. 29, 2023

(87) PCT Pub. No.: WO2022/207432
PCT Pub. Date: Oct. 6, 2022

(65) Prior Publication Data
US 2024/0262335 A1      Aug. 8, 2024

(30) Foreign Application Priority Data
Mar. 29, 2021    (DE) ..................... 10 2021 203 122.6

(51) Int. Cl.
*B60T 17/22*      (2006.01)
(52) U.S. Cl.
CPC .................................. *B60T 17/22* (2013.01)

(58) Field of Classification Search
CPC . G01L 5/28; B60T 17/00; B60T 17/18; B60T 17/22; B60T 17/221; B60T 17/228;
(Continued)

(56) References Cited

U.S. PATENT DOCUMENTS

| | | |
|---|---|---|
| 3,897,979 A | 8/1975 | Vangalis et al. |
| 8,155,844 B2 | 4/2012 | Peters |

(Continued)

FOREIGN PATENT DOCUMENTS

| | | |
|---|---|---|
| CA | 2652618 A1 | 8/2010 |
| CN | 111959463 A | 11/2020 |

(Continued)

OTHER PUBLICATIONS

CVSA, Air Brake Stroke Brochure, 2019, http://fleetweb. pantherpremium.com/Resources/ShowDocument/98 (Year: 2019).*

*Primary Examiner* — Timothy P Graves
(74) *Attorney, Agent, or Firm* — Laurence A. Greenberg; Werner H. Stemer; Ralph E. Locher

(57) ABSTRACT

A vehicle includes a rotationally movable actuating element and a sensor arrangement for measuring an actuating angle of the actuating element. The sensor arrangement has a measuring acceleration sensor which is fastened to the actuating element, and a reference acceleration sensor which is fastened immovably to the vehicle. A method for measuring the actuating angle of a rotationally movable actuating element in a vehicle, a measuring arrangement configured to carry out a method for measuring, a computer program product and a provision apparatus for the computer program product, are also provided.

16 Claims, 5 Drawing Sheets

(58) Field of Classification Search
CPC .. B61H 5/00; B61H 1/00; F16D 66/00; F16D
66/027; G01B 5/00; G01B 5/0028
See application file for complete search history.

(56) References Cited

U.S. PATENT DOCUMENTS

| | | | |
|---|---|---|---|
| 11,697,405 B2 | 7/2023 | Tomberger et al. | |
| 2006/0033382 A1* | 2/2006 | Steph ...................... | B60T 17/08 |
| | | | 303/7 |
| 2021/0154820 A1* | 5/2021 | Bianco ................... | G01C 19/00 |

FOREIGN PATENT DOCUMENTS

| | | |
|---|---|---|
| DE | 19918803 C1 | 9/2000 |
| DE | 102007045846 A1 | 4/2009 |
| DE | 102013222201 A1 | 4/2015 |
| EP | 3676138 A1 | 7/2020 |

* cited by examiner

Measuring Acceleration Sensor

Output Facility

Reference Acceleration Sensor

VEHICLE HAVING A SENSOR ARRANGEMENT FOR MEASURING AN ACTUATING ANGLE OF THE ACTUATING ELEMENT, MEASURING ARRANGEMENT AND MEASUREMENT METHOD

FIELD AND BACKGROUND OF THE INVENTION

The invention relates to a vehicle with a rotationally movable actuating element and with a sensor arrangement for measuring an actuating angle of the actuating element. Moreover the invention relates to a method for measuring the actuating angle of a rotationally movable actuating element in a vehicle in which a sensor arrangement for measuring the actuating angle is employed. The invention furthermore relates to a measurement arrangement that is configured for carrying out a method for measuring. Lastly the invention relates to a computer program product and also to a provision apparatus for this computer program product, wherein the computer program product is equipped with program commands for carrying out this method.

In vehicles there is a plurality of actuating elements, of which the function must be checked for any errors occurring. This applies in particular to brakes, since these represent safety-relevant functional elements of the vehicle. Brake linings are subject to wear, so that said linings must be replaced when a wear limit is reached. Moreover malfunctions can occur in brakes, in particular it can occur that a brake lining or a brake shoe carrying the brake lining is lost, whereby the function of the brakes is adversely affected.

For example it is ensured before the departure of freight trains that the braking system of the wagon is functioning correctly. In this case tests are performed as to whether all brake shoes of the freight wagons (vehicles) are present, and the linings still have a sufficient thickness of lining and whether the brakes are able to be applied and released.

The check as to whether all brake shoes of a freight wagon are present and have a sufficient lining thickness is currently made by a manual optical check by the freight yard foreman during the preparation of a train. Equipping the brake linings with wear sensors, as is usually undertaken with passenger vehicles, for example, is dispensed with for freight wagons for reasons of cost. The reason for this is not least that the number of brake linings employed for a freight wagon far exceeds that used for a passenger vehicle.

CA 2652618 A1 describes a sensor arrangement for freight wagons that can monitor the function of a braking system. This is undertaken by detecting an actuating angle of an actuating element that is used for the actuation of the brakes.

Document DE 10 2013 222 201 A1 describes a sensor arrangement for detecting a pedal movement in a vehicle with an evaluation and control unit and an at least two-channel measurement sensor moved with the pedal. An at least two-channel reference sensor is arranged in a fixed location in the vehicle.

SUMMARY OF THE INVENTION

The object of the invention consists of specifying a vehicle with a rotationally movable actuating element, for example an actuating element for a brake, or a sensor arrangement for such an actuating element, which can be operated as reliably as possible with little maintenance outlay. Moreover an object of the invention is to specify a method that can be employed for operation of such a vehicle with low maintenance outlay and high reliability. Moreover the object of the invention consists of specifying a computer program product and also a provision apparatus for this computer program product, with which the aforementioned method can be carried out.

This object is achieved with the claimed subject matter (vehicle) specified at the outset in accordance with the invention by the sensor arrangement having a measuring acceleration sensor, which is fastened to the actuating element, and a reference acceleration sensor, which is fastened immovably to the vehicle. Moreover the sensor arrangement is configured, taking into account the direction of the acceleration due to gravity (g), for generation of angle measurement data dependent on the actuating angle ($\alpha$) and the vehicle position, and taking into account the direction of the acceleration due to gravity (g), for generation of measurement error measurement data dependent on the position of the vehicle, for computer-aided calculation of the actuating angle ($\alpha$) from the angle measurement data, taking into account the measurement error measurement data, and for calculation as the actuating angle ($\alpha$) of at least one stop value for the actuating element (STE), which is measured when an increase in the actuating angle ($\alpha$) is prevented by a stop.

The fact that the reference acceleration sensor is fastened immovably to the vehicle means that this is in a fixed position with regard to a coordinate system permanently linked to the vehicle. In a fixed position in the sense of the invention means that the reference acceleration sensor does not participate in any rotation of the actuating element but also in any other movement relative to the vehicle (at least during the measurement).

By contrast the measuring acceleration sensor is fastened in a fixed position on the actuating element, i.e. that this is in a fixed position with regard to a coordinate system that is linked to the actuating element. This also means however that the acceleration sensor, during a rotation of the actuating element, carries out a rotation together with said element, which is able to be described in a fixed-position coordinate system linked to the vehicle and in a global coordinate system permanently linked to the earth.

The measuring acceleration sensor determines the angle of the actuating element compared to the vector of the earth's gravity (aligned with the center of the earth) through a measurement of earth's gravitation, preferably in three spatial axes orthogonal to one another (for example the global coordinate system, more about this below). It is thus also only suitable for levers of which the angle does not change parallel to the earth's surface, i.e. with a vertical axis of rotation.

An angular offset of the axis of rotation of greater than 0° with regard to the vertical axis of the vehicle, for the function of the measuring acceleration sensor, is thus a prerequisite for its function. This means that the axis of rotation of the rotationally supported actuating element in relation to the vertical axis of the vehicle must be tilted, i.e. have a tilt angle of greater than 0°, preferably of greater than 30°, even more preferably of greater than 60°. Only then, because of a change in the actuating angle, is a change in the measured acceleration established, when the acceleration due to gravity acts on the acceleration sensor conditional on the rotation of the actuating element at another angle.

The vertical axis of the vehicle means an imaginary axis that, in the case in which the vehicle is standing on horizontal ground below it, is aligned precisely vertically. This means that the vertical axis in this case precisely corresponds to the alignment of the acceleration due to gravity.

The inventive measuring acceleration sensor can be installed at any given point on the movable actuating element. In this case it does not possess any moving parts itself that must be protected from environmental influences and is therefore very robust and simple to install. This is where it has a significant advantage compared to other sensor principles, which must be installed at the midpoint of the axis of rotation of the actuating element, which for retrofitting and specifically for braking systems of freight wagons, is very difficult.

It is possible for the position of the axis of rotation to change in relation to the earth's surface during operation (for example through an imbalance of the vehicle from time to time, inclines or sideways inclination of the line, in particular of a track). This change in position is in principle determined as well by the measuring acceleration sensor, but as regards measurement however represents an unknown measurement error. This change in position is therefore determined in accordance with the invention by means of the reference acceleration sensor. The values of the measuring acceleration sensor must therefore be set against the values of the reference acceleration sensor in order to compensate for measurement errors.

In this case there is a free choice of installation locations for the reference acceleration sensor, provided the installation location is located on the vehicle in such a way that the reference acceleration sensor participates in all movements of the vehicle as a whole. In other words no relative movement may occur between the vehicle and the reference acceleration sensor. Thus the reference acceleration sensor must be fastened immovably to the vehicle. By contrast the measurement acceleration sensor is fastened movably to the vehicle, since it is located on the actuating element movable rotationally on the vehicle and therefore participates in its movements. On the actuating element itself the measuring acceleration sensor is immovably fastened at least in respect of the rotation to be measured, i.e. with regard to the degree of freedom linked to the rotation to be measured.

The following advantages can be achieved with the construction described here.

The installation location of the measuring acceleration sensor on the actuating element can be selected completely freely and without restrictions to the mechanical connections.

The installation location of the reference acceleration sensors for determining the position of the axis of rotation can be selected completely freely and without restrictions to the mechanical connections, provided its position changes with the position of the vehicle.

The freedom in the installation positions means that no changes to constructions that may possibly exist are needed, the inventive measurement arrangement can therefore be retrofitted without any problems.

The freedom in the installation positions means that a cost-optimized type of installation can be chosen for both sensors independently of one another In accordance with one embodiment of the invention there is provision for the measuring acceleration sensor and the reference acceleration sensor to be embodied as a three-axis sensor.

The use of a three-axis sensor for the reference acceleration sensor and the measuring acceleration sensor has the advantage that rotational changes of position in the three-dimensional space can be measured independently of the three axes of the Cartesian coordinate system for which the rotation is actually taking place. Especially precise measurements are advantageously possible through this. In particular a sideways tilting of the vehicle as well as a fall or rise in the ground on which the vehicle is located can be taken into account.

A minimal tilting at an angle to the direction of rotation of the axis of rotation has no significant influence on the measurement of the angle, since the sine component of the change in angle is small with small angles and the measurement error resulting therefrom can therefore be ignored. Therefore with small tilt angles a 2-axis sensor can also be employed, wherein the said tilting remains unconsidered.

For an axis of rotation at an angle to the direction of travel the said tilting is a lateral inclination of the vehicle (for example negotiating a curve). With an axis of rotation in the direction of travel the said tilting is an inclination in the direction of travel (for example climbing or descending).

In accordance with one embodiment of the invention there is provision for the rotationally supported actuating element to form a part of a brake linkage for the vehicle.

The part of the brake linkage that forms the actuating element can involve a (rotatably supported) shaft or rotatably supported lever. Pure push or pull rods on the other hand are not suitable since these are moved translationally.

Before the departure of a freight train it can be ensured that the braking system of a vehicle (freight wagon) is functioning correctly. In this case it must be ensured inter alia that all brake linings of a bogie or freight wagon are present and still have a sufficient lining thickness.

With the inventive sensor arrangement it is possible, with shoe-braked vehicles, because of the change in angle, to check from just one element of the brake linkage on the wagon whether all linings are still present and whether the thickness of the brake linings used is still sufficient and whether the brakes are released or are actually engaged (more on this in conjunction with the inventive method).

This advantageously means that a sensor-aided monitoring of the brake linings is made possible with just a little measuring effort. Moreover the inventive vehicle can also be realized by retrofitting of the inventive sensor arrangement, since the measuring acceleration sensor and also the reference acceleration sensor are fastened to the surface of elements of the vehicle without the elements involved (possibly with relevant approvals) having to be modified themselves in their function or design.

In accordance with one embodiment of the invention there is provision for the axis of rotation of the rotational actuating element in the vehicle to be installed at least essentially horizontally when installed in its installation position.

An at least essentially horizontal installation position is also provided when the installation position is not exactly horizontal, preferably inclined by up to 10° from the horizontal.

With a horizontally aligned axis of rotation the change of the acceleration values measured because of the rotation is included fully in the angle calculation, whereby advantageously the calculation method is simplified, as shown below. At the same time measurement errors occurring are advantageously reduced.

In a global coordinate system the axis of rotation of the actuating element would lie on the y-axis and the acceleration due to gravity would act in the direction of the z-axis. In order in this simple case to calculate the angle of inclination to the earth's surface with the aid of the acceleration sensor, simplifying assumptions can be made. The sensor is rotated by the angle α about the y-axis, thereby the acceleration in the x or z-direction changes. The following applies:

$$A_z = g \cdot \cos(\alpha) \text{ and } - A_x = g \cdot \sin(\alpha)$$

And thus:

$$\alpha = \arctan\left(- A_x / A_z\right)$$

wherein $A_z$ and $A_x$ are the respective acceleration components in the z-direction and x-direction.

In accordance with one embodiment of the invention there is provision for the vehicle to have an output facility, wherein this is configured to receive a result connected to the measurement of the actuating angle via an output interface.

The output facility advantageously makes it possible for information connected to the measurement of the actuating angle, which for example contains the need for maintenance of a brake, to be able to be displayed directly on the vehicle. In the operation of a freight wagon for example, this advantageously simplifies the assessment of maintenance measures necessary. For example train personnel can establish with the aid of the output facility whether the brakes have functioned properly during the last journey or whether they must be inspected more closely for assessment of required maintenance measures. In particular the personnel can establish when readying a train or before its departure whether the brakes are operating properly. If this information is made available live to the train driver via an electronic device (for example a brake monitoring system), this contributes to shortening the preparation time for a train.

In the simplest case the output facility can be a warning light, which shows the need for a maintenance measures. The output facility can also involve a display, which can transfer symbols or text information, for example the information "maintenance needed". It is also possible for the output facility to output a radio signal, which is received in a control center for example, in order to assess the need for maintenance measures.

In accordance with one embodiment of the invention there is provision for the reference acceleration sensor and the output facility to be designed as one structural unit.

A sensor arrangement, in which the reference acceleration sensor and the output facility are designed as one structural unit, advantageously makes possible a simpler installation on the vehicle. In this case the structural unit must be attached in such a way that the output facility is easy to operate or to read for the rail personnel. The installation location must at the same time allow a fixed-position connection of the structural unit, so that the acceleration sensor can fulfill its function.

By contrast the measuring acceleration sensor is fastened to the actuating element, which normally is less suitable for accommodating a display or output facility on account of its restricted access.

As an alternative the said object is also inventively achieved with the subject matter claimed at the outset (method) by angle measurement data being generated through the sensor arrangement taking into account the direction of the acceleration due to gravity of the actuating angle and the vehicle position and by measurement error measurement data dependent on the vehicle position being generated, taking into account the direction of the acceleration due to gravity, and also for computer-aided calculation of the actuating angle from the angle measurement data, taking into account the measurement error measurement data.

The advantages connected with the carrying out of the method for determining an actuating angle of a rotationally moved actuating element have already been explained here in conjunction with the inventive vehicle and apply accordingly for the inventive method.

For the inventive method use is made in accordance with the invention of the situation in which the acceleration due to gravity is always aligned vertically to the center of the earth and to this extent represents as a vector a reliable reference for determining an actuating angle. Angle legs do not lie exactly in a horizontal plane (i.e. the axis of rotation of an actuating element realizing the actuating angle is aligned vertically).

The angle measurement data is thus generated in relation to the vertical direction of the acceleration due to gravity, wherein the measuring method must be suitable for determining the actuating angle with regard to this reference.

"Processor-aided" or "computer-implemented" can be understood in conjunction with the invention as an implementation of the method in which at least one computer or processor carries out at least one method step of the method.

The expression "processor" or "computer" covers all electronic devices with data processing characteristics. Computers can for example be Personal Computers, servers, handheld computers, mobile radio devices and other communication devices, which process data in a computer-assisted manner, processors and other electronic devices for data processing, which can preferably also be connected together to form a network.

A "processor" can be understood in conjunction with the invention for example as a converter or a sensor for generation of measurement signals or an electronic circuit. A processor can in particular involve a Central Processing Unit (CPU), a microprocessor, a microcontroller or a digital signal processor, possibly in combination with a memory unit for storage of program commands, etc. A processor can also be understood as a virtualized processor or a soft CPU.

A "memory unit" can be understood in conjunction with the invention for example as a computer-readable memory in the form of a Random-Access Memory (RAM) or data memory (hard disk or data medium).

"Interfaces" can be realized in hardware, for example by cables or as a wireless connection, and/or by software, for example as an interaction between individual program modules or parts of programs of one or more computer programs.

"Program modules" are to be understood as individual functional units that make an inventive program execution sequence of method steps possible. These functional units can be implemented in a single computer program or in a number of computer programs communicating with one another. The interfaces realized here can be implemented as software within a single processor or as hardware, when a number of processors are used.

In accordance with one embodiment of the invention there is provision for the angle measurement data to be generated with a measuring acceleration sensor, which is fastened to the actuating element and for the measurement error measurement data to be generated with a reference acceleration sensor, which is fastened immovably to the vehicle.

The use of acceleration sensors (measuring acceleration sensor and reference acceleration sensor) has the advantage that said sensors use the acceleration due to gravity caused by their measurement principle. Compared to other sensors, such as for example gyroscopes, which must be calibrated with respect to the direction of action of the acceleration due to gravity, this makes the measuring method simpler in use and more reliable with respect to the occurrence of measurement errors.

In accordance with the invention there is provision for at least one stop value for the actuating element to be calculated as the actuating angle, which is measured when an increase in the actuating angle is prevented by a stop.

With vehicles there is a plurality of rotationally supported actuating elements, the position of which is limited by at least one stop. The use of the inventive method on these actuating elements makes a monitoring of the function possible. Here it can be checked for example whether the intended actuating angle reaches the stop or is constrained.

In accordance with one embodiment of the invention there is provision for a brake stop value to be calculated as the stop value, which is formed for a stop through a frictional contact between the friction partners of a brake, and/or a release stop value to be calculated, which is formed by a stop in the brake mechanism in the released state of the brake.

The application of the method to brakes requires that the brakes are adjusted by means of at least one rotational actuating element. The contact between the brake lining and the other friction partner of the brake is to be understood as a stop to be monitored with such brakes.

The transmission of force from actuator (for example brake cylinder) to the brake is undertaken for example in most freight wagons available on the market via a brake linkage, which has at least one rotatable shaft and/or a pivotable deflection lever. With freight wagons the force is transmitted for example by a pull rod in the wagon chassis, which pulls a deflection lever fastened to the wheel set. Via the deflection lever and a further linkage the tractive force is distributed to all brake shoes of a bogie or a wagon chassis and leads to an even pressure of the brake shoes on the wheel rims.

In this case the change in angle of the deflection lever or the shaft is in a direct relationship with the sum of the distances that the brake lining moves in a braking process between released and applied position. The more heavily the brake linings are worn, the greater is the change in angle compared to the new state of the brake linings in the applied state, i.e. at the stop (more about this below).

In accordance with one embodiment of the invention there is provision for the braking stop value to be stored as a calibration value for the braking stop and/or the release stop value as a calibration value for the release stop.

The method step of a calibration is especially of advantage when the brake linings have just been renewed and thus no measured values are available for the expected (or also new) braking system. The stop values, which are then calculated by an activation or deactivation of the brake as brake stop value and release stop value from the associated measured values, then form a reference for the new state of the brake linings, which can be stored in the memory facility.

A calibration step can however also be carried out during the time that the brake linings are in use. For example the wear on the brake linings can be precisely measured in turn during maintenance measures and subsequently new calibration values can be created for the measured state of the brake linings.

In accordance with one embodiment of the invention there is provision for the brake stop value to be compared, in a computer-assisted manner, with a limit value and for there to be an output as to whether the stop value is below the limit value and/or reaches and/or exceeds it.

If the construction-based relationship between the change of angle for brand new brake linings and the remaining lining thickness to be detected is known, the lining thickness can be deduced from the angle setting of the lever and an angle assigned to the wear limit to be detected.

The wear on the linings causes the setting angle up to the stop and thereby the stop value with the brake applied to increase slowly but constantly between the new state and the wear limit, until it reaches the previously defined limit value. The change in angle between two braking processes barely differs in this case however. Over the course of time during regular operation however the limit value will be reached and subsequently exceeded.

If this angle is reached, the information can either be sent electronically to the person responsible for the maintenance or displayed visually for the freight yard foreman by means of a display facility attached to the vehicle (for example the display of a brake monitoring system).

In accordance with one embodiment of the invention there is provision for a series of computer-aided measurements of brake stop values and/or a series of measurements of release stop values to be created and for the last calculated brake stop value and/or release stop value to be compared with at least one earlier brake stop value and/or release stop value of the series of measurements. Naturally in this case brake stop values are always compared with other brake stop values of the series of measurements involved and release stop values with other release stop values of the series of measurements involved.

Since the wear on the shoes between two braking operations lies in the micrometer range, under normal circumstances no change in angle would be able to be established by measurement between two braking operations. The creation of a series of measurements makes it possible however to trace the development. This for example makes predictions possible about the course of the wear and impending maintenance measures such as replacement of the brake linings.

In accordance with one embodiment of the invention there is provision for the difference between the last brake stop value calculated and a brake stop value of a series of measurements lying before the brake stop value to be calculated and for there to be an output as to whether this difference is below a maximum allowable difference and/or reaches and/or exceeds it.

In this case the maximum allowable difference is established from empirical values for a specific type of brake in such a way that this lies above a value applicable for the usual wear of the brake linings. This means that a brake stop value that exceeds this maximum allowable difference has been measured because of an extraordinary event. Given the requirement that the measuring method is functioning properly, the fact that the maximum allowable difference is exceeded therefore points to the loss of at least one brake shoe. This loss is namely compensated for in the brake linkage by said linkage, while setting a greater actuating angle of the actuating element concerned, being adjusted until such time as all brake linings and the at least one receptacle of the missing brake shoe have reached the brake stop.

Thus if at least one of the shoes (brake linings) is lost, the distance to be covered during braking suddenly increases for the brake linkage. This greater distance is also expressed in a sudden and measurable change in the said actuating angle.

This can be determined by a simple comparison with the last stop value of the series of measurements calculated.

Since a lost brake shoe cannot be replaced during the journey, it is normally sufficient to make the measurement before the start of the journey or after the end of the journey and to store the measured value. The comparison is then always made between the current value and the stored value (thus, for this application case, the consideration of a series of measurements with two stop values, the current and the one before it), is sufficient.

In accordance with one embodiment of the invention there is provision for the actuating angle to be measured when the vehicle is stationary.

Basically the measurement of the actuating angle while the vehicle is moving is also possible. Accelerations occurring in this case are eliminated by the reference acceleration sensor (or by the measurement result created with sensor). However the measurement errors occurring and to be eliminated can advantageously be kept smaller if the measurement is made when the vehicle is stationary.

Therefore more precise results can advantageously be created when stationary.

A further advantage lies in the fact that, when the vehicle is stationary during the measuring method, the brakes can be (briefly) activated and deactivated for the purposes of creating the measured values. In this way it is possible to determine both a brake stop value and a release stop value in quick succession after one another.

As an alternative the said object is also achieved with subject matter claimed at the outset (measurement arrangement) in accordance with the invention, by the measurement arrangement having:

a measuring acceleration sensor for creation of measurement data dependent on an actuating angle of an actuating element and on a vehicle position, a reference acceleration sensor for creation of measurement data dependent on a vehicle position, an output facility, a computer, a first interface between the measuring acceleration sensor and the computer, a second interface between the reference acceleration sensor and the computer and an output interface between the output facility and the computer.

For carrying out the method specified above the measurement arrangement can be installed in a vehicle already described above. The measurement arrangement is advantageously also especially suitable, within the framework of a retrofit, for installation into an existing braking system of a freight wagon. In this case the measurement arrangement represents an independent functional system, because this also has a computer for calculating the actuating angle from the measured values determined (of the measuring acceleration sensor and the reference acceleration sensor).

Furthermore a computer program product with program commands for carrying out the said inventive method and/or its exemplary embodiments is claimed, wherein the inventive method and/or its exemplary embodiments are each able to be carried out by means of the computer program product.

What is more a provision apparatus for storage and/or provision of the computer program products is claimed. The provision apparatus is for example a memory unit that stores and/or provides the computer program product. As an alternative and/or in addition the provision apparatus is a network service for example, a computer system, a server system, in particular a distributed, for example cloud-based, computer system and/or virtual processor system, which stores and/or provides the computer program product, preferably in the form of a data stream.

The program is provided in the form of a program data block as a file, in particular as a download file, or as a data stream, in particular as a download data stream, of the computer program product. This provision can for example however also be undertaken as a partial download, which consists of a number of parts. Such a computer program product is read in for example using the provision apparatus into a system, so that the inventive method is carried out on a computer.

Further details of the invention are described below with the aid of the drawing. Elements of the drawing that are the same or that correspond to one another are each provided with the same reference characters and are only explained more than once in so far as any differences emerge between the individual figures.

The exemplary embodiments explained below involve preferred forms of embodiment of the invention. In the exemplary embodiments the components described each represent individual features of the invention to be considered independently of one another, which each also develop the invention independently of one another and thereby are to be seen, individually or in a combination other than the one shown, as an element of the invention. Furthermore the components described are also able to be combined with the features of the invention described above.

DETAILED DESCRIPTION OF THE INVENTION

Figure 1:
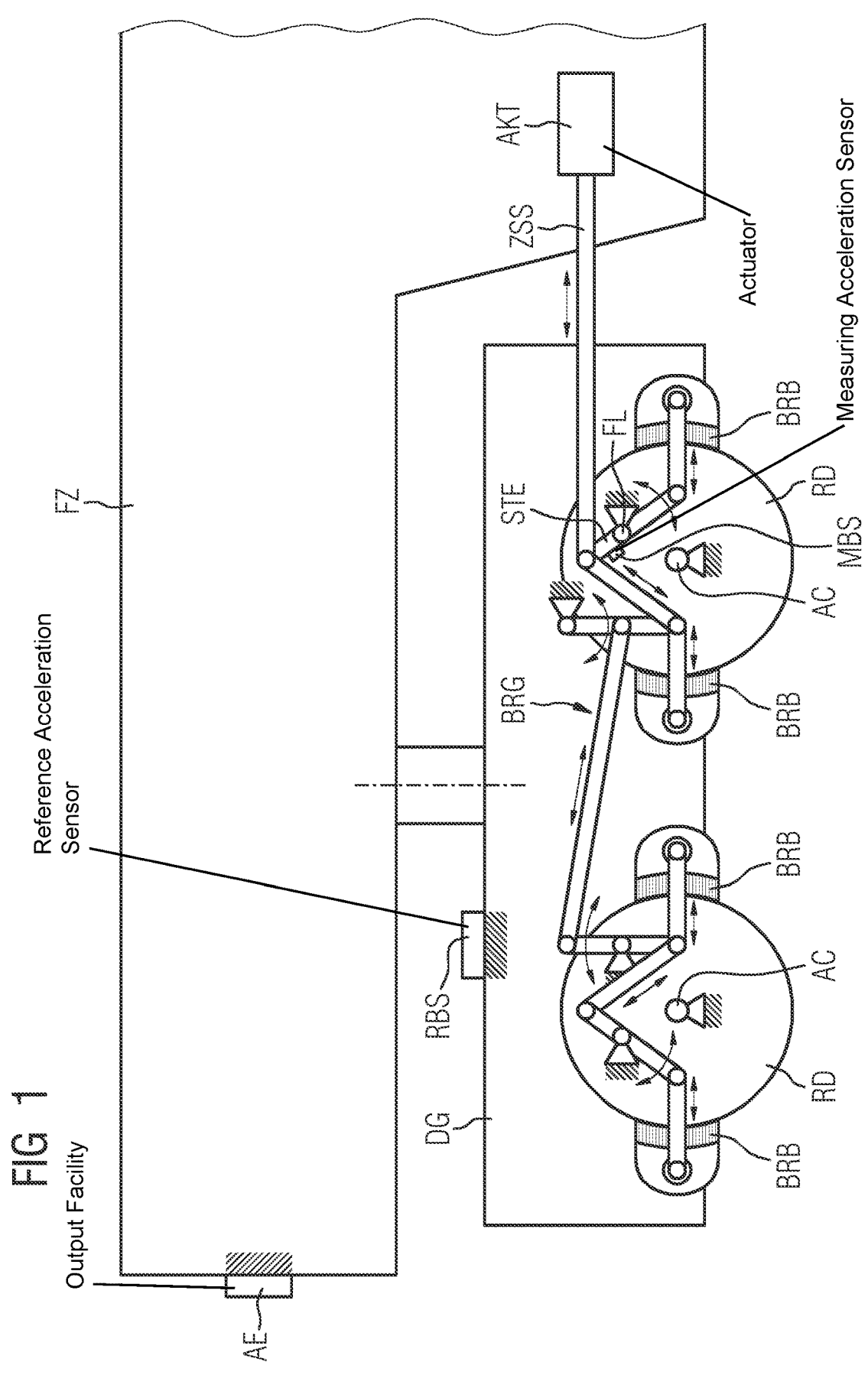
FIG. 1 shows a schematic exemplary embodiment of the inventive vehicle with its working relationships.

Shown in FIG. 1 is a vehicle FZ in the form of a freight wagon. This vehicle FZ has a bogie DG at the end of the vehicle shown, which supports the wheels RD in two axes. Furthermore a brake linkage BRG is shown schematically, which transmits a movement of an actuator AKT to the brake linings BRB, wherein the brake linings BRB act directly on rims of the wheels RD not shown in the figure.

The brake linkage BRG is shown schematically. What is involved here is a mechanical transmission for transmission of the adjustment movement of the actuator AKT, for example of a hydraulic cylinder, on the brake linings BRB. The transmission consists of pull and push rods ZSS, which at least primarily carry out a translational movement, indicated in FIG. 1 by double-ended arrows parallel to the linkage alignment. Furthermore there are levers which can be pivoted about an axis of rotation, indicated by curved double-ended arrows transverse to the alignment of the levers. Axes of rotation or articulated joints are indicated by circles at the ends of the pull or push rods ZSS and also the levers or are indicated in their center. Furthermore the support of the axles on the vehicle FZ by fixed bearings FL is indicated, wherein a respective hatching indicates the rigid connection to the vehicle FZ (incl. that of the bogie).

One of the levers represents the actuating element STE, which is supported pivotably about the fixed bearing FL indicated, and which is moved by the pull or push rod ZSS coming from the actuator AKT. A measuring acceleration sensor MBS is fastened firmly to this actuating element, so that said sensor tilts back and forth with the actuating element STE. Moreover there is a reference acceleration sensor RBS, which is firmly connected to the vehicle FZ, in accordance with FIG. 1 with bogie DG (forms a part of the vehicle FZ). The measuring acceleration sensor MBS and the reference acceleration sensor RBS communicate via radio interfaces not shown in any greater detail with an output facility AE, wherein the output facility AE also contains a computer for evaluation of the received measured values (cf. also FIG. 2). As an alternative cable interfaces can also be used (not shown).

Figure 2:
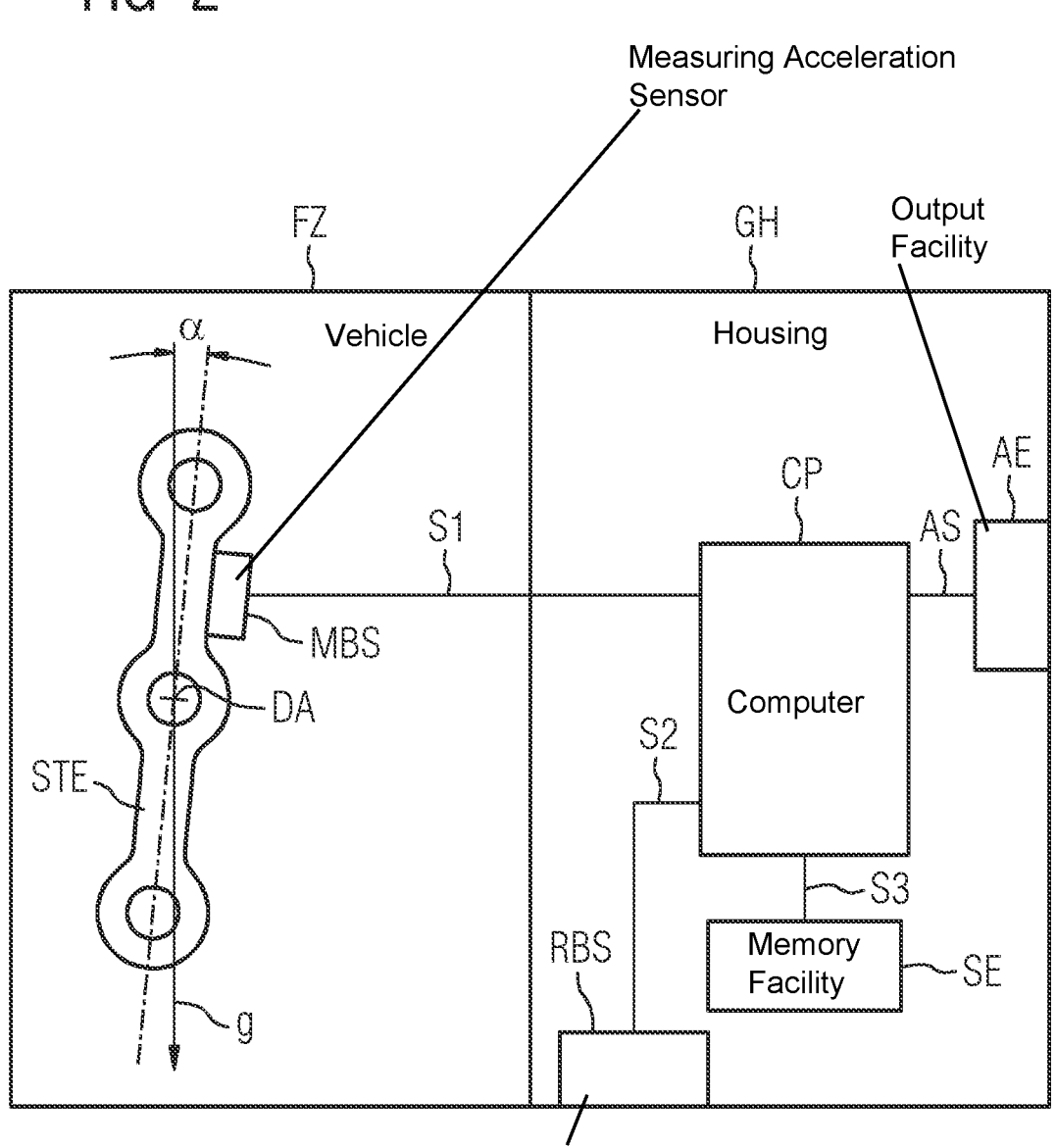
FIG. 2 shows, as a block diagram, an exemplary embodiment of a computer infrastructure of the inventive measurement arrangement, such as can also be used in a vehicle in accordance with FIG. 1 wherein the individual functional units contain program modules, which in each case can run in one or more processors, and the interfaces can accordingly be implemented as software or hardware.

Shown schematically as a block diagram in FIG. 2 is the interaction of the functional elements involved in the inventive method. In this case the vehicle FZ is in a block symbolizing the vehicle FZ and a housing GH, which, unlike in FIG. 1, accommodates both the reference acceleration sensor RBS and also the output facility AE and is connected firmly to the vehicle FZ. Shown in the vehicle FZ by way of example is the actuating element STE, which is rotatably supported about an axis of rotation DA (corresponds to the indicated fixed bearing FL in accordance with FIG. 1). Firmly connected to the actuating element STE is the measuring acceleration sensor MBS.

Unlike the variant shown in FIG. 1, the output facility AE and the reference acceleration sensor RBS are supported in a common housing GH. This advantageously simplifies the installation, wherein the reference acceleration sensor RBS is thereby automatically connected in a fixed position to the vehicle FZ.

The measuring acceleration sensor MBS is connected via a first interface S1 and the reference acceleration sensor RBS via a second interface S2 to a computer CP, which evaluates the measurement results. The computer CP is moreover connected via a third interface S3 to a memory facility SE, wherein actuating angles calculated in the memory facility SE in the form of a series of measurements can be stored there as well as calibration values for a commissioning of the brakes and limit values for their wear. The computer CP is connected to the output facility AE via an output interface AS, wherein the output facility AE is preferably a display, which can display information with regard to the operation of the brake, or a system with for example a radio interface, which can transmit the information directly to a central point, for example the locomotive (not shown). In the simplest case the output facility AE can be embodied by (at least) one light, which displays without any further information, just the need for maintenance (flashing for wear on the brake linings BRB beyond the limit of wear, loss of brake shoes/brake linings) and the current state of the brake (lit corresponds to locked/not lit corresponds to unlocked).

In FIG. 2 an actuating angle $\alpha$ is defined as the deviation of the alignment of the actuating element STE (indicated by its dotted and dashed axis of symmetry) from the vertical axis, in which the acceleration due to gravity g acts (indicated by an arrow pointing downwards). For the method of angle calculation from acceleration values this is an advantageous variant, since the calculated angle then precisely corresponds to the actuating angle $\alpha$. Basically the actuating angle $\alpha$ can also be calculated from any other position of the actuating element STE. For example the setting of a calibrated position of the actuating element at the release stop, i.e. with the brake released, or at the braked stop, i.e. with the brake applied, can be set to zero.

When the entire vehicle FZ is tilted compared to acceleration due to gravity g (not shown here) the angle $\alpha$ likewise contains a component resulting from the inclination of the vehicle FZ. This must then be calculated out, by the angle value measured by the reference acceleration sensor being subtracted from the angle value measured by the measuring acceleration sensor in order to obtain the actuating angle.

Figure 3:
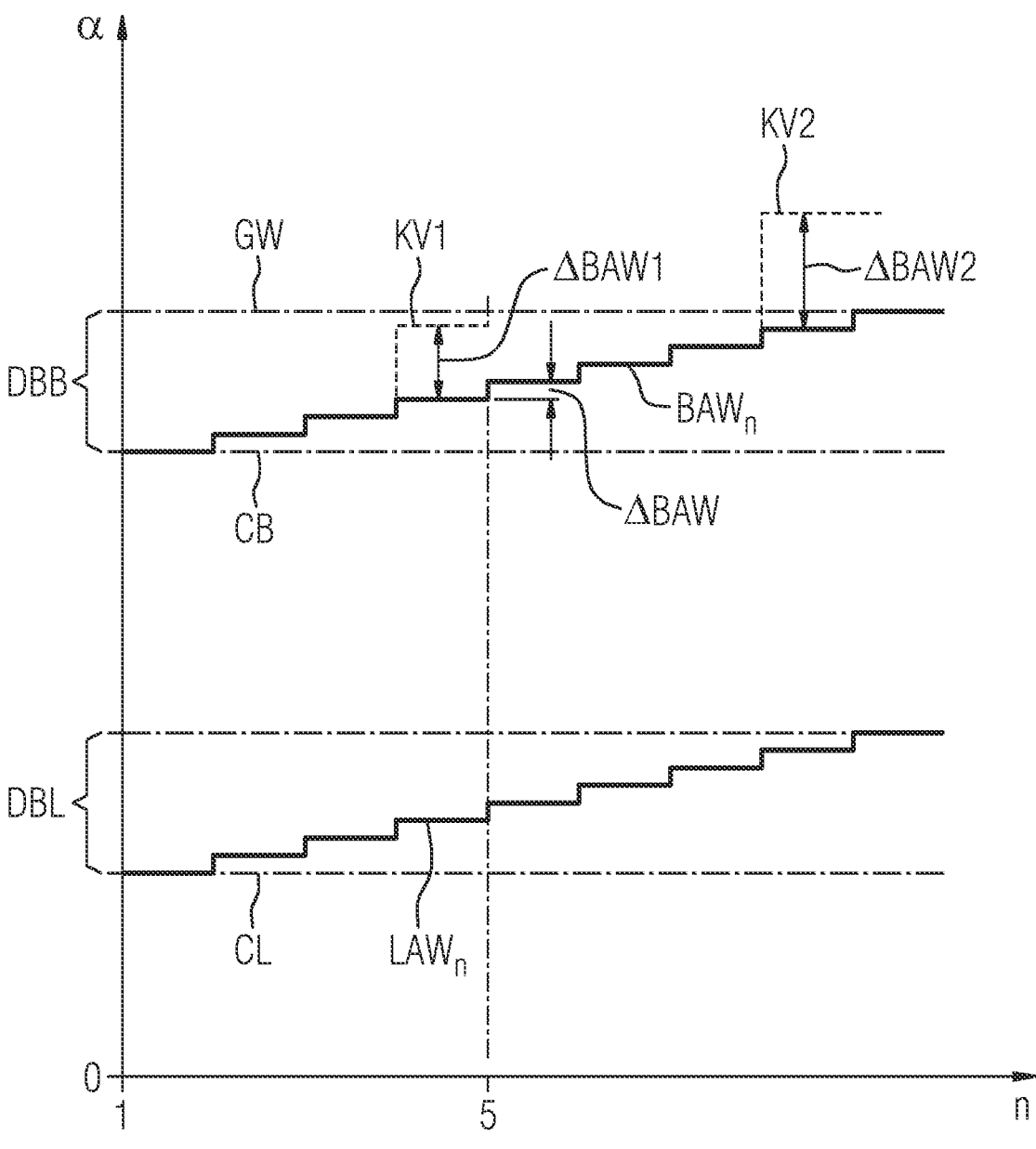
FIG. 3 shows a diagram in which the change in the actuating angle $\alpha$ is shown as a function of individual measurements n, which produce series of measurements.

FIG. 3 shows how the actuating angle $\alpha$ (measured as described for FIG. 2) changes through the wear on the brake linings in the course of individual measurements n made. It becomes clear here that measurements are only being carried out at discrete points in time, for example before commissioning of the vehicle in each case, and that a stepped graph is produced by this. Shown in each case are individual measurements for the brake stop value $BAW_n$ and also individual measurements n for the release stop value $LAW_n$. The release stop value LAW and also the brake stop value BAW are each determined from the measured accelerations of the measuring acceleration sensor MBS and of the reference acceleration sensor RBS (cf. FIG. 1).

During the first measurement in accordance with FIG. 3 (n=1) the brake linings are in their new state. With this measurement the inventive measurement arrangement is calibrated, wherein one calibration value CL is calculated for the release stop value $LAW_1$ and one calibration value CB for the brake stop value $BAW_1$. These can be stored in the memory facility SE (cf. FIG. 2).

During the subsequent measurements the actuating angles $\alpha$ get larger through wear on the brake linings (brake stop values $BAW_n$). The release stop values $LAW_n$ too can change, as shown in FIG. 3, when, depending on wear on the brake linings, a mechanical adjustment of the release stop provided during the release of the brake in the brake linkage is carried out (depending on the design of the vehicle). If such an adjustment of the release stop does not take place, the release stop value LAW remains constant, so that the calibration value for the release stop CL does not change.

Shown in FIG. 3 for the development of the brake stop value $BAW_n$ is a limit value GW, which specifies that the brake linings have reached their wear limit. The calibration value for the brake stop CB and also the limit value GW define a drift range for the brake stop DBB. A drift range DBL for the release stop value is produced by this automatically by the mechanical adjustment of the release stop.

As already mentioned, the steps in the graph of the brake stop value BAW arise through the wear on the brake linings, wherein in each case a wear-related difference between two brake stop values $\Delta BAW$ lies between individual measurements n, n+1. This is normally small and lies in the micrometer range. Therefore, in order to avoid measurement inaccuracies, on creation of a series of measurements (which is shown by the stepped graph in accordance with FIG. 3) there is also recourse to measurement lying further back, for example for a measurement n, to the brake stop value $BAW_{n-10}$.

Shown in FIG. 3 is also a jump in the brake stop value BAW for a loss of a brake shoe KV1 or for a loss of two brake shoes KV2. It is evident that the difference ΔBAW1 and also the difference ΔBAW2 is very much higher, since the brake linkage is compensating for the loss and the actuating element STE thus suddenly implements a larger actuating angle during braking. The loss of brake shoes is recognized through this and can be output via the output facility AE.

Figure 4:
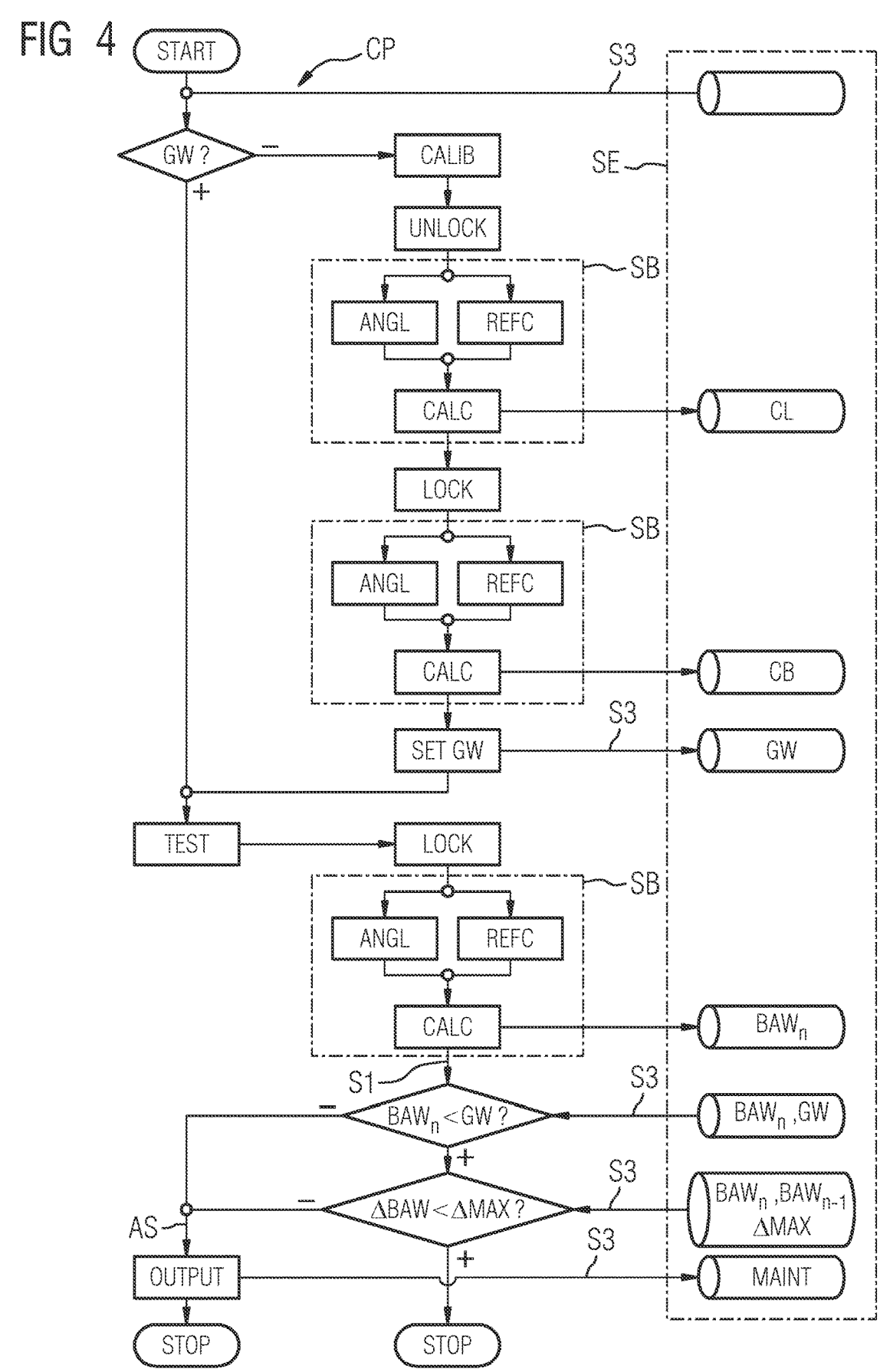
FIGS. 4 and 5 show exemplary embodiments of the inventive method as flow diagrams, wherein the individual method steps can be realized individually or in groups by program modules and wherein the functional units and interfaces in accordance with FIG. 3 are shown by way of example.

The execution sequence for the inventive measuring method can be taken from FIG. 4 by way of example. After the method has been started, the available parameters are loaded from the memory facility SE. In an interrogation step a check is made as to whether a limit value GW is available. If it is not, new brake linings are involved, which is why a calibration step CALIB is carried out.

During calibration the brakes are first released in a deactivation step UNLOCK. Then, in a measurement step ANGL of the measuring acceleration sensor an actuating angle measurement value is determined for the angle setting of the actuating element and in a measurement step REFC for the reference value by the reference acceleration sensor a measurement error measurement value is created. In a subsequent calculation step CALC the calibration value for the release stop CL is calculated and transferred into the memory facility SE.

The calculation of the calibration value for the release stop CL and also of further release stop values LAW and also brake stop values BAW (including the calibration value for the brake stop CB) are carried out in the exemplary embodiment in accordance with FIG. 4 by a sensor module SB, which also makes available processing capacity for the calculation step CALC. This is however only an exemplary embodiment. It is also possible for the measurement steps for the angle setting ANGL as well as the reference value REFC for carrying out the calculation step for the actuating angle CALC to be transferred to the computer CP. This represents a configuration that has been described in accordance with FIG. 2. For FIG. 4 (and likewise for FIG. 5) it is true to say that in this case the system limit for the sensor module SB indicated by the dashed and dotted line would be omitted without anything else changing in the execution sequence of the method.

In the next step there is an activation step LOCK for the brake, so that the brake linings rest against the brake stop. The measurement and calculation step ANGL, REFC, CALC described above is repeated and delivers the calibration value for the brake stop CB, which is transferred by the computer CP to the memory facility SE.

In the subsequent step, starting from the calibration value for the brake stop CB and the knowledge of the circumstances of the braking system, which can be stored as formulae in the memory facility SE, in a determination step for the limit value SET GW, the limit value GW is calculated and transferred by the computer CP into the memory facility SE.

When a limit value GW already exists, the calibration step CALIB can be left out and there is a test step TEST to test the state of the brake. For this purpose an activation step of the brake LOCK is carried out, provided the brake is not already applied. Subsequently the calculation ANGL, REFC, CALC of the actuating angle by the sensor module SB, as already stated above, is carried out. Then the current brake stop value $BAW_n$ can be transferred by the computer CP to the memory facility SE. Subsequently the computer CP tests whether the current brake stop value $BAW_n$ is below the limit value GW. For this purpose the limit value GW is read out from the memory facility SE. For the case in which the limit value GW is reached or exceeded, in an output step OUTPUT there is the output of a maintenance signal, which can be sent directly to the output facility AE in accordance with FIG. 2 or is stored as a maintenance signal MAINT in the memory facility SE in order to be displayed later.

If the brake stop value $BAW_n$ is below the limit value GW, there is a further interrogation, for which the previously determined brake stop value $BAW_{n-1}$ and also the maximum allowable difference ΔMAX for a change of the brake stop value BAW are read out from the memory facility SE. If the calculated difference between the brake stop values $BAW_n$ and $BAW_{n-1}$ is less than the maximum allowable difference ΔMAX, the test is ended, and the method is stopped. If the said maximum is exceeded then this means that the brake has lost at least one brake shoe, so that likewise in the output step OUTPUT for the maintenance signal there is an output by the output facility AE or the need for maintenance MAINT is transferred by the computer CP to the memory facility SE for later output. The method is also stopped after this.

Figure 5:
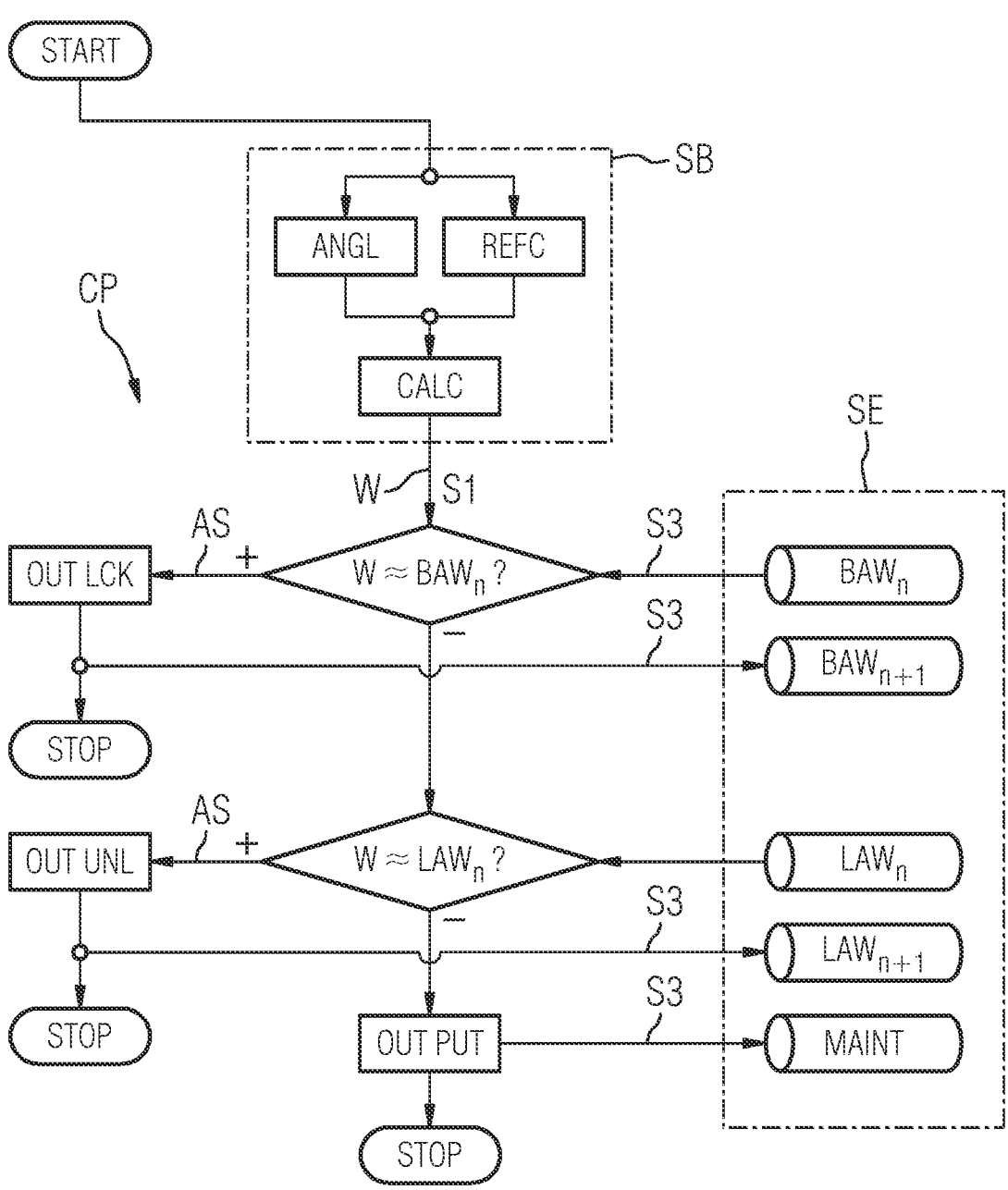

Shown in FIG. 5 is another function that can be fulfilled by means of the inventive sensor arrangement. This involves the recognition of the state of the brake, i.e. whether the brake linings are in the activated (engaged) position or the deactivated (released) position. After the start of the method the measurement and calculation step ANGL, REFC, CALC is carried out by the sensor module SB. Here the value W is calculated, which is available for the further method. In a subsequent interrogation a check is made as to whether the value W approximately corresponds to the current brake stop value $BAW_n$. If it does the output step OUT LCK that the brake is activated is executed, i.e. in the braked position. Optionally the value W can be transferred as a new brake stop value $BAW_{n+1}$ from the computer CP to the memory facility SE. Subsequently the method is stopped.

If the value W does not correspond approximately to the brake stop value $BAW_n$, then in a further interrogation step there is a check as to whether the value W approximately corresponds to the current release stop value $LAW_n$. If it does, an output step OUT UNL that the brake is deactivated, i.e. opened, is executed. Optionally the value W can be transferred as the current release stop value $LAW_{n+1}$ by the computer CP to the memory facility SE. After this the method is stopped.

If the result of the second interrogation step is also negative, i.e. no similarity exists between the value W and the current release stop value $LAW_n$, the output step OUTPUT for a maintenance signal is executed. Moreover maintenance request MAINT is transferred to the memory facility SE by the computer CP. After this the method is stopped.

In the interrogation as to whether the value W approximately corresponds to the brake stop value $BAW_n$ or the release stop value $LAW_n$, on the one hand measurement errors are to be taken into account, which can be determined in any event with knowledge of the accuracy of the measuring method (therefore an approximate match, i.e. within a confidence interval is demanded). Moreover account is to be taken of the fact that, as already explained for FIG. 3, a difference ΔBAW between the brake stop values determined related to wear can be produced between the measurements. The same possibly applies for the release stop value LAW. This change, referred to as drift in the drift ranges for the brake stop DBB and for the release stop DBL (cf. FIG. 3), is likewise to be taken in account when the confidence interval for an approximate match of the value W is defined.

LIST OF REFERENCE CHARACTERS

FZ Vehicle
DG Bogie
RD Wheel
AC Axle
FL Fixed bearing
ZSS Pull-push rod
BRG Brake linkage
AKT Actuator
BRB Brake lining
STE Actuating element
DA Axis of rotation
MBS Measuring acceleration sensor
RBS Reference acceleration sensor
GH Housing
AE Output facility
CP Computer
SE Memory facility
SB Sensor module
AS Output interface
S1 . . . S3 Interface
CALIB Calibration step
UNLOCK Deactivation step for brake
ANGL Measurement step for angle setting
REFC Measurement step for reference value
CALC Calculation step for actuating angle
LOCK Activation step for brake
SET GW Determination step for limit value
TEST Test step
OUTPUT Output of maintenance signal
MAINT Request for maintenance
OUT LCK Output step for activated brake
OUT UNL Output step for deactivated brake
α Actuating angle
g Acceleration due to gravity
n Measurement number
CL Calibration value for the release
CB stop
DBB Calibration value for the brake stop
DBL Drift range of brake stop
BAW Drift range of release stop
LAW Brake stop value
ΔBAW Release stop value
AMAX Difference between two brake stop
GW values
KV1 Maximum allowable difference
KV2 Limit value
W Shoe loss (one brake lining) Shoe loss (two brake linings) Value

The invention claimed is:

1. A vehicle, comprising:

a rotationally movable actuating element and a sensor arrangement for measuring an actuating angle of said actuating element;

said sensor arrangement having:

a measuring acceleration sensor fastened to said actuating element, and a reference acceleration sensor being separate from said measuring acceleration sensor and being fastened immovably to the vehicle;

said sensor arrangement configured to:

use said measuring acceleration sensor to take into account a direction of acceleration due to gravity aligned vertically to the center of the earth, to generate angle measurement data in a global coordinate system dependent on the actuating angle and a vehicle position, and use said reference acceleration sensor to take into account the direction of the acceleration due to gravity, to generate error measurement data in the global coordinate system dependent on the vehicle position;

the vehicle configured for computer-aided calculation of the actuating angle from the angle measurement data, taking into account the measurement error measurement data; and the vehicle configured to calculate as the actuating angle at least one stop value for said actuating element, being measured upon an increase in the actuating angle prevented by a stop.

2. The vehicle according to claim 1, wherein said measuring acceleration sensor and said reference acceleration sensor are three-axis sensors.

3. The vehicle according to claim 1, wherein said rotationally movable actuating element forms a part of a brake linkage for the vehicle.

4. The vehicle according to claim 1, wherein said rotational actuating element has an axis of rotation in the vehicle being oriented at least substantially horizontally in an installation position.

5. The vehicle according to claim 1, which further comprises an output interface, and an output facility configured to receive a result linked to the measurement of the actuating angle through said output interface.

6. The vehicle according to claim 5, wherein said reference acceleration sensor and said output facility are configured as one structural unit.

7. A method for measuring an actuating angle of a rotationally movable actuating element in a vehicle, the method comprising:

using a sensor arrangement for measuring the actuating angle by:

generating measurement data dependent on the actuating angle and a vehicle position, by taking a direction of acceleration due to gravity aligned vertically to the center of the earth into account, and generating the angle measurement data in a global coordinate system with a measuring acceleration sensor fastened to the actuating element, and generating measurement error measurement data dependent on the vehicle position, by taking the direction of the acceleration due to gravity into account, and generating the measurement error measurement data in the global coordinate system with a reference acceleration sensor fastened immovably to the vehicle and being separate from said measuring acceleration sensor;

carrying out a computer-aided calculation of the actuating angle from the angle measurement data, by taking the measurement error measurement data into account; and calculating at least one stop value for the actuating element as the actuating angle, being measured upon an increase in the actuating angle prevented by a stop.

8. The method according to claim 7, which further comprises providing stop values by at least one of:

calculating a brake stop value formed by a frictional contact between friction partners of a brake, or calculating a release stop value formed by a stop in a brake mechanism in a released state of the brake.

9. The method according to claim 8, which further comprises storing the brake stop value as a calibration value for at least one of a brake stop or the release stop value as a calibration value for the release stop.

10. The method according to claim 8, which further comprises:
    carrying out a computer-aided comparison between the brake stop value and a limit value; and
    providing an output as to whether the stop value is at least one of less than the limit value or reaches the limit value or exceeds the limit value.

11. The method according to claim 8, which further comprises:
    carrying out computer-aided generation of at least one of a series of measurements of brake stop values or a series of measurements of release stop values; and
    comparing at least one of a calculated last brake stop value or release stop value with at least one of at least one earlier brake stop value or release stop value of the series of measurements.

12. The method according to claim 11, which further comprises:
    calculating a difference between the calculated last brake stop value and a brake stop value of the series of measurements lying before the brake stop value; and
    providing an output as to whether the difference is at least one of below a maximum allowed difference or reaches the maximum allowed difference or exceeds the maximum allowed difference.

13. The method according to claim 7, which further comprises carrying out the measurement of the actuating angle when the vehicle is stationary.

14. A measurement arrangement for carrying out a measurement method, the measurement arrangement comprising:
    a measuring acceleration sensor for generating measurement data in a global coordinate system linked to the earth dependent on an actuating angle of an actuating element and a vehicle position;
    a reference acceleration sensor disposed separate from said measuring acceleration sensor for generating measurement data in a global coordinate system linked to the earth dependent on the vehicle position;

an output facility;
    a computer;
    a first interface between said measuring acceleration sensor and said computer;
    a second interface between said reference sensor and said computer; and
    an output interface between said output facility and said computer.

15. A non-transitory computer program product with program commands stored thereon that, when executed on a processor, carries out steps for measuring an actuating angle of a rotationally movable actuating element in a vehicle, comprising:
    using a sensor arrangement for measuring the actuating angle by:
        generating measurement data dependent on the actuating angle and a vehicle position, by taking a direction of acceleration due to gravity aligned vertically to the center of the earth into account, and generating the angle measurement data in a global coordinate system with a measuring acceleration sensor fastened to the actuating element, and
        generating measurement error measurement data dependent on the vehicle position, by taking the direction of the acceleration due to gravity into account, and generating the measurement error measurement data in the global coordinate system with a reference acceleration sensor fastened immovably to the vehicle and being separate from said measuring acceleration sensor;
    carrying out a computer-aided calculation of the actuating angle from the angle measurement data, by taking the measurement error measurement data into account; and
    calculating at least one stop value for the actuating element as the actuating angle, being measured upon an increase in the actuating angle prevented by a stop.

16. A non-transitory provision apparatus for the computer program product according to claim 15, the computer-readable medium at least one of storing or providing the computer program product.

* * * * *